United States Patent [19]
Tanaka

[11] Patent Number: 4,770,139
[45] Date of Patent: Sep. 13, 1988

[54] ENGINE COMBUSTION CHAMBER STRUCTURE

[75] Inventor: Hideki Tanaka, Hiroshima, Japan

[73] Assignee: Mazda Motor Corporation, Japan

[21] Appl. No.: 54,891

[22] Filed: May 28, 1987

[30] Foreign Application Priority Data

Jun. 4, 1986 [JP] Japan ................... 61-128206

[51] Int. Cl.⁴ .................................... F02B 31/00
[52] U.S. Cl. ........................ 123/308; 123/193 CP
[58] Field of Search ............ 123/260, 256, 266, 308, 123/193 P, 193 CP

[56] References Cited

U.S. PATENT DOCUMENTS 4,009,702  3/1977  Mayer ......................... 123/260
4,586,465  5/1986  Krogdahl .................. 123/193 P

FOREIGN PATENT DOCUMENTS 59-96323  1/1984  Japan ......................... 123/308

*Primary Examiner*—Henry A. Bennet
*Attorney, Agent, or Firm*—Gerald J. Ferguson, Jr.

[57] ABSTRACT

A combustion chamber is defined by a cylinder having an upper wall surface shaped like a pent-roof and a piston provided on the head portion thereof with a bulged portion conforming to the upper wall surface in shape. A semi-spherical first bowl portion is formed substantially at the center of the bulged portion, and a pair of second bowl portions are formed in the bulged portion to respectively extend on opposite sides of the first bowl portion to the corresponding ends of the bulged portion of the piston along the edge of the bulged portion and to be communicated with the first bowl portion. A swirl generating mechanism is provided to generate a swirl of intake air in the combustion chamber when the engine load is light, and a spark plug is disposed to substantially face the center of the first bowl portion from the upper wall surface.

12 Claims, 3 Drawing Sheets

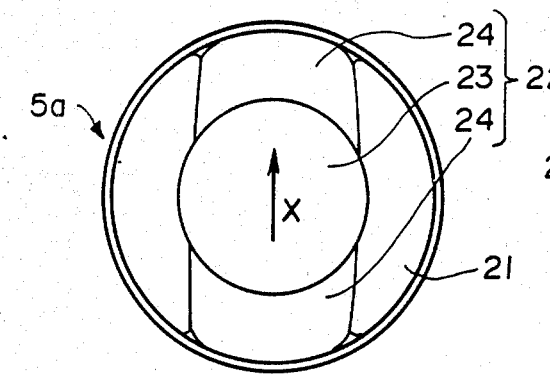
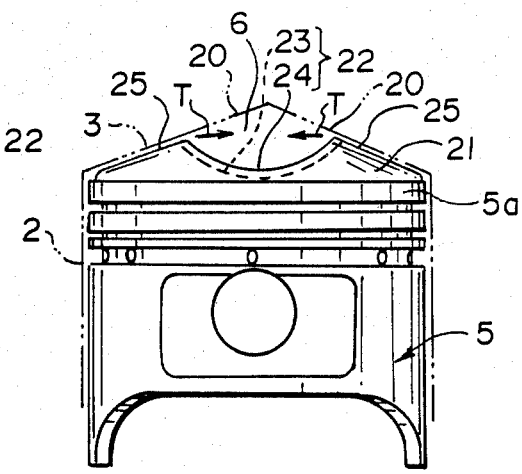
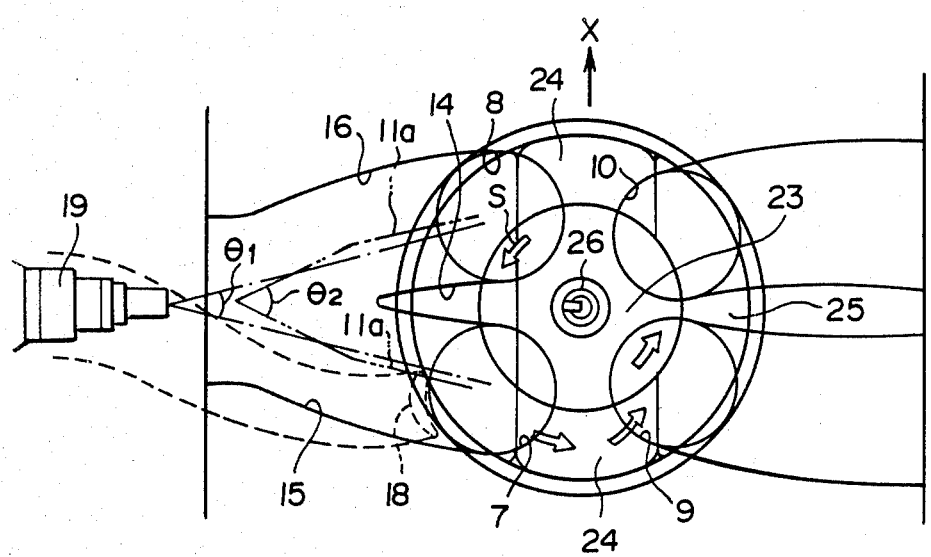

ENGINE COMBUSTION CHAMBER STRUCTURE

BACKGROUND OF THE INVENTION

1. Field of the Invention

This invention relates to a combustion chamber structure of an internal combustion engine, and more particularly to a structure of a pent-roof shaped combustion chamber of an internal combustion engine.

2. Description of the Prior Art

In order to improve the volumetric efficiency to increase the engine output power, it has been known to enlarge the area of the intake port or the like or to increase the number of the valves. For this purpose, a pent-roof shaped combustion chamber is generally employed because of the high degree of freedom it allows in the selection of the area of the valves. In order to improve combustion in the pent-roof shaped combustion chamber, there has been proposed forming the piston head with a bulge that conforms to the shape of the combustion chamber and to form a bowl in the bulged portion to define the combustion chamber, thereby making the combustion chamber compact and at the same time forming a squish area between the piston and the roof surfaces of the pent-roof shaped combustion chamber. See Japanese Unexamined Utility Model Publication No. 59(1984)-96323, for instance.

However, such a combustion chamber structure gives rise to a problem that the squish flow is insufficient at opposite end portions of the edge of the pent-roof at which two roof surfaces merge, and unburned gasses remain at the portions thereby increasing the HC component in the exhaust gas. That is, since the ends of the edge of the pent-roof shaped combustion chamber are defined by vertical walls extending in the sliding direction of the piston, it is difficult to form an effective squish flow between the vertical walls and the piston.

This problem may be overcome by extending the bowl formed in the bulged portion of the piston to the ends of the edge of the combustion chamber. However, this approach is disadvantageous in that the irregular shape of the bowl can adversely affect swirl formation in the combustion chamber. Though swirl in the combustion chamber can be enhanced by selective arrangement of the intake port, this approach can give rise to another problem of pumping loss being increased due to increased intake resistance, thereby adversely affecting fuel economy.

SUMMARY OF THE INVENTION

In view of the foregoing observations and description, the primary object of the present invention is to provide a pent-roof shaped combustion chamber structure in which the combustion chamber can be made compact without increasing the HC component of the exhaust gas and, at the same time, in the case that swirl generation in the combustion chamber is to be applied to the engine, enables satisfactory swirl to be generated.

In accordance with the present invention, there is provided a combustion chamber structure comprising an upper wall surface which is shaped like a pent-roof and into which an intake passage opens, a piston provided on the head portion thereof with a bulged portion conforming to the upper wall surface in shape, a first bowl portion which is formed substantially at the center of the bulged portion and is substantially semi-spherical in shape, a pair of second bowl portions which respectively extend on opposite sides of the first bowl portion to the corresponding ends of the bulged portion of the piston along the edge of the bulged portion and are communicated with the first bowl portion, a swirl generating means which is adapted to generate a swirl of intake air in the combustion chamber when the engine load is light, and a spark plug disposed to substantially face the center of the first bowl portion from the upper wall surface.

DESCRIPTION OF THE DRAWINGS

FIG. 1 is a plan view of a piston head employed in a combustion chamber structure in accordance with an embodiment of the present invention, FIG. 3 is a schematic plan view of the combustion chamber structure, FIG. 4 is a side view of the piston.

DESCRIPTION OF THE PREFERRED EMBODIMENT

Figure 2:
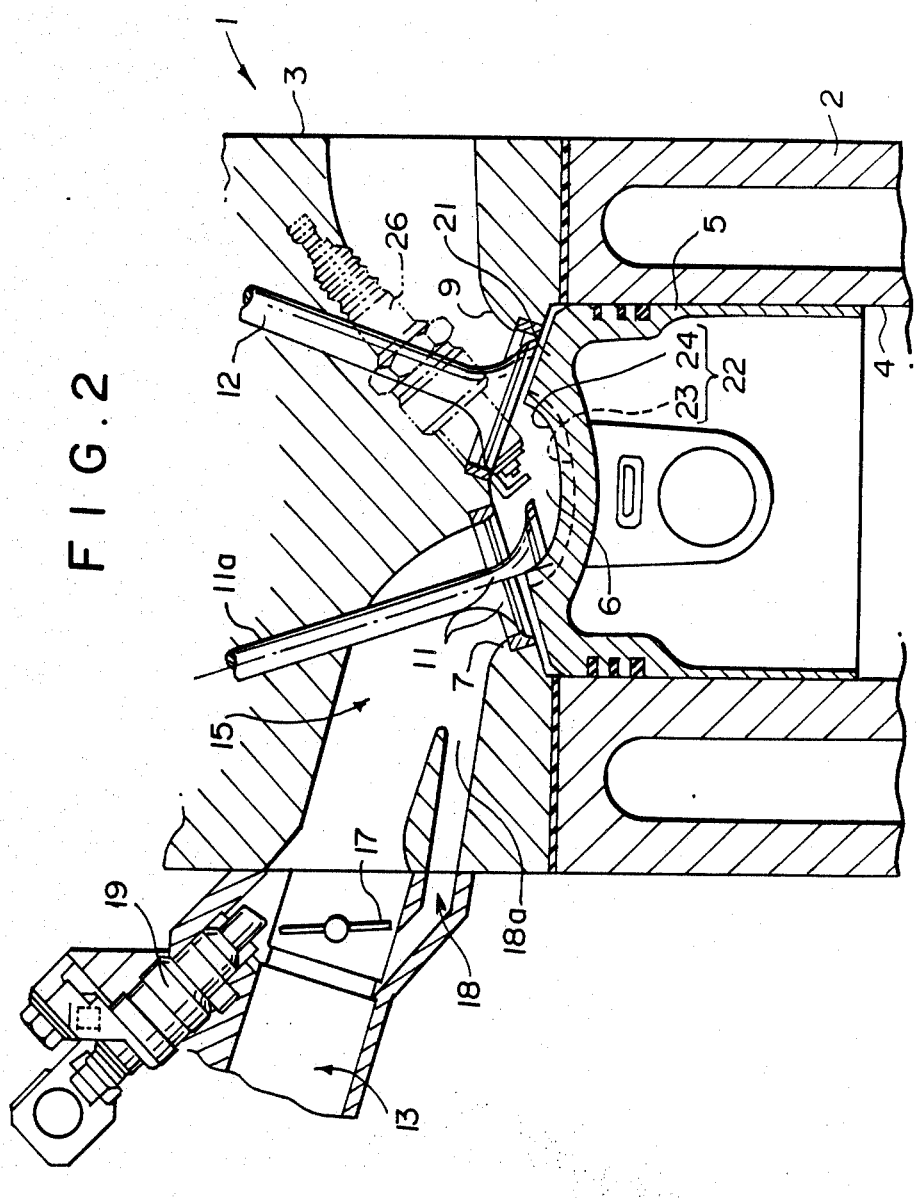
FIG. 2 is a cross-sectional view showing a combustion chamber structure in accordance with an embodiment of the present invention.

In FIGS. 2 and 3, an engine 1 is formed by a cylinder block 2 and a cylinder head 3, and a piston 5 is received in each cylinder 4 in the engine 1. Above the piston 5 is formed a combustion chamber 6. First and second intake ports 7 and 8 and first and second exhaust ports 9 and 10 open into the combustion chamber 6. The intake ports 7 and 8 are provided with intake valves 11 (only the intake valve 11 for the first intake port 7 is shown) and the exhaust ports 9 and 10 are provided with exhaust valves 12 (only the exhaust valve for the first exhaust port 9 is shown). The intake valves 11 and the exhaust valves 12 are driven by a valve driving mechanism (not shown) to open and close the intake ports 7 and 8 and the exhaust ports 9 and 10 at predetermined timings.

The intake ports 7 and 8 are communicated with an intake passage 13. In the cylinder head 3, the intake passage 13 is branched by a partition wall 14 into first and second branch passages 15 and 16 which are respectively communicated with the first and second intake ports 7 and 8. The intake passage 13 is provided with a shutter valve 17 disposed slightly upstream of the branch point of the first and second branch passages 15 and 16 and with a light load passage 18 bypassing the shutter valve 17. The shutter valve 17 is closed to completely close the intake passage 13 or to close the intake passage 13 to a small opening when the engine load is light, and is opened when the engine load is heavy. The downstream end 18a of the light load passage 18 opens into the first intake port 7 and is directed substantially in a direction tangential to the cylinder 4.

A fuel injection valve 19 is disposed in the intake passage 13 slightly upstream of the partition wall 14. The fuel injection valve 19 is adapted to inject fuel toward both the first and second branch passages 15 and 16, and the injection angle $\theta_1$ of the fuel injection valve 19 is smaller than the valve stem included angle $\theta_2$ of the intake valves 11. The valve stems of the intake valves 11 are indicated at 11a.

The combustion chamber 6 is of a pent-roof shaped type defined by a pair of roof surfaces 20 (FIG. 4) formed in the cylinder head 3. The piston 5 is provided at the head portion 5a with a bulged portion 21 conforming to the shape of the combustion chamber 6, and a bowl 22 is formed in the bulged portion 21.

The bowl 22 comprises a first bowl portion 23 formed substantially at the center of the bulged portion 21 (see also FIGS. 1 and 4) and a pair of second bowl portions 24 which respectively extend on opposite sides of the first bowl portion 23 to the corresponding ends of the bulged portion 21 of the piston 5 in the direction of the edge (indicated at X) of the combustion chamber 6 along which the roof surfaces 20 merge, and are communicated with the first bowl portion 23. The first bowl portion 23 is substantially semi-spherical in shape and the second bowl portions 24 are semi-cylindrical in shape.

With this arrangement of the piston 5, there are formed in the combustion chamber 6 a semi-spherical main combustion chamber defined by the first bowl portion 23, sub-combustion chambers which are formed by the second bowl portions 24 and extend on opposite sides of the main combustion chamber to the ends of the combustion chamber 6 in the direction of the edge X, and a squish area 25 defined between the roof surfaces 20 and the part of the bulged portion 21 other than the first and second bowl portions 23 and 24. A spark plug 26 is disposed substantially at the center of the first bowl portion 23.

When the engine load is light, the shutter valve 17 is closed and air-fuel mixture is introduced into the combustion chamber 6 mainly through the light load passage 18, whereby a swirl S of air-fuel mixture is generated in the combustion chamber 6. The swirl S is maintained in the semi-spherical first bowl portion 23 over the compression stroke, and at the same time, a squish flow T is generated in the squish area 25. Thus, in the first bowl portion 23, a flow of gas is generated by virtue of the swirl S and the squish flow T, and in the second bowl portions 24, a flow of gas is generated by virtue of the squish flow T. By the flow of gas, combustion in the first bowl portion 23 is improved and at the same time, combustion in the second bowl portions 24 is promoted, thereby reducing the HC component in the exhaust gas.

In this particular embodiment, since the injection angle $\theta_1$ of the fuel injection valve 19 is smaller than the valve stem included angle $\theta_2$, fuel injected from the fuel injection valve 19 is apt to be concentrated and accordingly the air-fuel mixture in the main combustion chamber defined by the first bowl portion 23 becomes relatively rich, whereby ignition and combustion are improved by virtue of a kind of stratified charging. It is preferred that fuel be injected immediately before the intake valves 11 are opened for uniform distribution of the air-fuel mixture in the combustion chamber. Further, in order to cause fuel to ride on the swirl S, it is preferred that the first intake port 7 is opened earlier than the second intake port 8.

Figure 5:
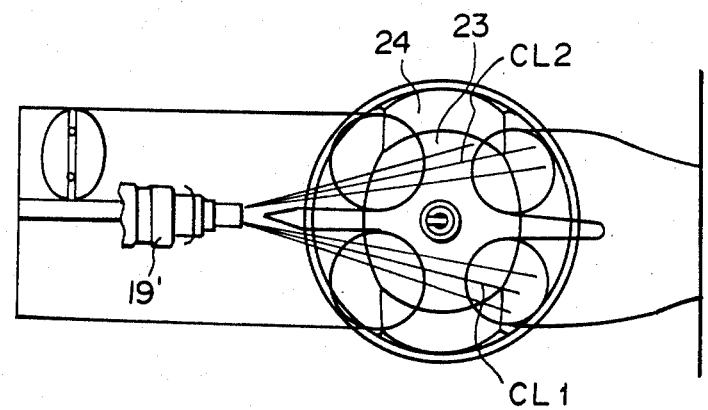
FIG. 5 is a plan view showing a modification of the combustion chamber structure shown in FIGS. 2 and 3.
Figure 6:
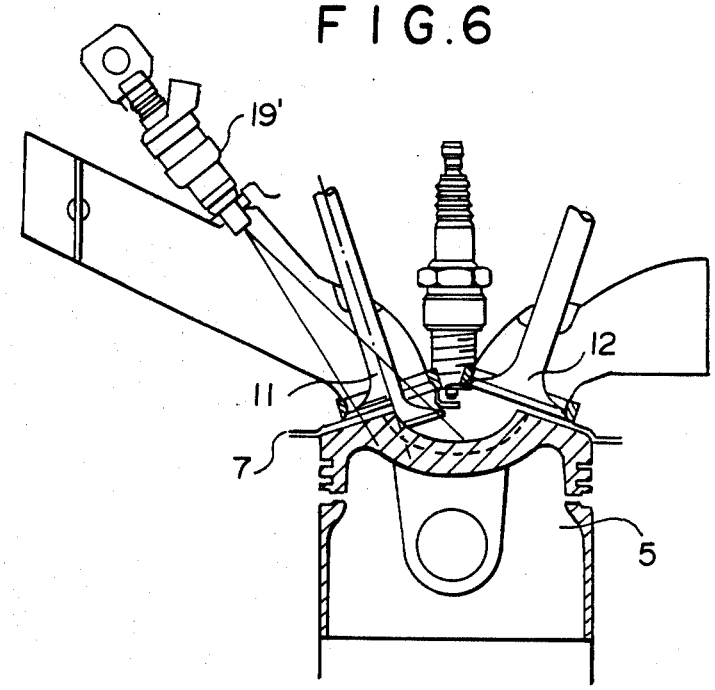
FIG. 6 is a cross-sectional view of the combustion chamber structure shown in FIG. 5.

In the modification shown in FIGS. 5 and 6, the fuel injection valve 19' has a pair of injection holes, one directed toward the first branch passage 15 and the other directed toward the second branch passage 16. The central axis $CL_1$ of the injection from the injection hole directed toward the first branch passage 15 is directed inside the innermost one of the lines joining the injection hole and the points on the junction line of the first bowl portion 23 and the second bowl portion 24 on the first branch passage side. Similarly the central axis $CL_2$ of the injection from the injection hole directed toward the second branch passage 16 is directed inside the innermost one of the lines joining the injection hole and the points on the junction line of the first bowl portion 23 and the second bowl portion 24 on the second branch passage side. This arrangement is advantageous from the viewpoint of improvement of combustion. That is, in the second bowl portions 24, the degree of attenuation of the swirl is relatively large and, accordingly, the flow of the air-fuel mixture is apt to dwell, which can deteriorate the atomization and volatilization of the fuel. By concentrating as much as possible of the fuel in the first bowl portion 23 in which the swirl is apt to be maintained, atomization and volatilization of the fuel can be improved to improve combustion in the combustion chamber.

I claim:

1. A combustion chamber structure comprising an upper wall surface which is shaped like a pent-roof and into which an intake passage opens,
    a piston having on a head portion thereof a bulged portion conforming to said upper wall surface in shape,
    a first bowl portion which is formed substantially at the center of said bulged portion and which is substantially semispherical in shape,
    a pair of second bowl portions which respectively extend on opposite sides of the first bowl portion to the corresponding ends of said bulged portion of the piston along the edge of the bulged portion and are in communication with said first bowl portion,
    a swirl generating means which is adapted to generate a swirl of intake air in the combustion chamber when the engine load is light, and
    a spark plug disposed to substantially face the center of the first bowl portion from the upper wall surface;
    said swirl generating means being adapted to generate the swirl of intake air in a tangential direction in the combustion chamber; and
    the diameter of said first bowl portion being larger than the width of said second bowl portion.

2. A combustion chamber structure as defined in claim 1 in which said swirl generating means comprises a main intake passage opening into the combustion chamber to introduce air thereinto, a control valve which is provided in the main intake passage to be closed when the engine load is light and to be opened when the engine load is heavy, and a sub-intake passage which branches off from the main intake passage upstream of the control valve and is connected to a portion of the main intake passage near the opening to the combustion chamber, the sub-intake passage being smaller than the main intake passage in cross-sectional area and directed substantially in a direction tangential to the combustion chamber.

3. A combustion chamber structure comprising an upper wall surface which is shaped like a pent-roof and into which an intake passage opens,
    a piston having on a head portion thereof a bulged portion conforming to said upper wall surface in shape, a first bowl portion which is formed substantially at the center of said bulged portion and which is substantially semispherical in shape, a pair of second bowl portions which respectively extend on opposite sides of the first bowl portion to the corresponding ends of said bulged portion of the piston along the edge of the bulged portion and are in communication with said first bowl portion, a swirl generating means which is adapted to generate a swirl of intake air in the combustion chamber when the engine load is light, and a spark plug disposed to substantially face the center of the first bowl portion from the upper wall surface;

said swirl generating means comprising a main intake passage opening into the combustion chamber to introduce air thereinto, a control valve which is provided in the main intake passage to be closed when the engine load is light and to be opened when the engine load is heavy, and a sub-intake passage which branches off from the main intake passage upstream of the control valve and is connected to a portion of the main intake passage near the opening to the combustion chamber, the sub-intake passage being smaller than the main intake passage in cross-sectional area and directed substantially in a direction tangential to the combustion chamber;

said main intake passage being branched into a pair of branch passages downstream of the control valve, the branch passages separately opening into the combustion chamber, said sub-intake passage being connected to a portion of one of the branch passages near the opening to the combustion chamber.

4. A combustion chamber structure as defined in claim 3 in which a fuel injection valve is provided so that the fuel injection hole is directed toward the main intake passage downstream of the control valve, the injection angle of the fuel injection valve being smaller than the angle of the branch passages are to each other.

5. A combustion chamber structure as defined in claim 4 in which the fuel injection valve injects fuel immediately before opening of the intake valves.

6. A combustion chamber structure as defined in claim 5 in which the intake valve for the branch passage to which the sub-intake passage is connected is opened earlier than the intake valve for the other branch passage.

7. A combustion chamber as defined in claim 1 in which said swirl generating means comprises first and second intake passages which separately open into the combustion chamber in one of the roof surfaces side by side, and a control valve disposed in the first intake passage to be closed when the engine load is light and to be opened when the engine load is heavy;

said second intake passage introducing the intake air in a direction tangential to the combustion chamber.

8. A combustion chamber structure as defined in claim 7 further comprising a fuel injection valve having first injection hole directed to a portion of the first intake passage downstream of the control valve and a second injection hole directed to the second intake passage.

9. A combustion chamber structure as defined in claim 1 in which said second bowl portion is semi-cylindrical.

10. A combustion chamber structure as defined in claim 1 in which squish area is defined between said upper wall surface of the combustion chamber and the head portion of said piston at regions thereof other than of said first and second bowl portions.

11. A combustion chamber comprising an upper wall surface which is shaped like a pent-roof and into which an intake passage opens, a piston having on a head portion thereof a bulged portion conforming to said upper wall surface in shape, a first bowl portion which is formed substantially at the center of said bulged portion and which is substantially semispherical in shape, a pair of second bowl portions which respectively extend on opposite sides of the first bowl portion to the corresponding ends of said bulged portion of the piston along the edge of the bulged portion and are in communication with said first bowl portion, a swirl generating means which is adapted to generate a swirl of intake air in the combustion chamber when the engine load is light, and a spark plug disposed to substantially face the center of the first bowl portion from the upper wall surface;

a fuel injector;

a pair of intake ports;

the injection angle of the fuel injector being set such that the fuel is directed within the first bowl portion; and said swirl generating means being adapted to generate the swirl of intake air in a tangential direction in the combustion chamber.

12. A combustion chamber structure as defined in claim 11 in which the diameter of said first bowl portion is larger than the maximum width of said second bowl portion.

* * * * *